(12) United States Patent
Hasegawa

(10) Patent No.: US 6,484,689 B1
(45) Date of Patent: Nov. 26, 2002

(54) FUEL INJECTION CONTROL APPARATUS FOR A DIESEL ENGINE

(75) Inventor: Manabu Hasegawa, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/111,605

(22) PCT Filed: Sep. 27, 2001

(86) PCT No.: PCT/JP01/08479

§ 371 (c)(1),
(2), (4) Date: Apr. 26, 2002

(87) PCT Pub. No.: WO02/29231

PCT Pub. Date: Apr. 11, 2002

(30) Foreign Application Priority Data

Oct. 2, 2000 (JP) ........................................ 2000-301725

(51) Int. Cl.[7] ................................................. F02B 3/00
(52) U.S. Cl. ........................ 123/299; 701/104; 701/105; 701/103
(58) Field of Search ........................... 123/299; 701/104, 701/105, 103

(56) References Cited

U.S. PATENT DOCUMENTS 4,543,930 A * 10/1985 Baker ........................ 123/276
5,119,780 A * 6/1992 Ariga ........................ 123/300
5,365,902 A * 11/1994 Hsu ............................ 123/299

* cited by examiner

Primary Examiner—Bibhu Mohanty
(74) Attorney, Agent, or Firm—Shinjyu Global IP Counselors, LLP

(57) ABSTRACT

A fuel injection control apparatus for a diesel engine (1) is provided that eliminates a torque step occurring when shifting from a pilot fuel injection mode to a normal injection mode. After finding a total fuel injection quantity QFIN per cycle (block 101), a pilot fuel injection quantity QPILOTB is subtracted therefrom to determine a pilot fuel injection quantity QPILOT and a main fuel injection quantity QMAIN (block 103). Corrected pilot fuel injection quantity QPILOTF and corrected main fuel injection quantity QMAINF are determined using a fuel temperature correction coefficient KQTHF and a pilot fuel injection thermal efficiency CEHPILOT (block 104) and a main fuel injection thermal efficiency CEHMAIN (block 105). The thermal efficiencies are established based on the respective injection timings. A change in torque does not occur because the change in the thermal efficiency caused by the injection timing is offset.

19 Claims, 8 Drawing Sheets

Center of Gravity Position (dQ/dθ)
Fig. 11
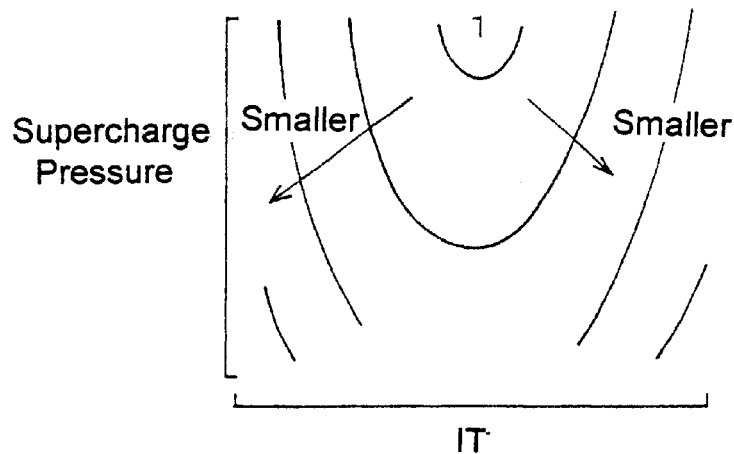
Fig. 12
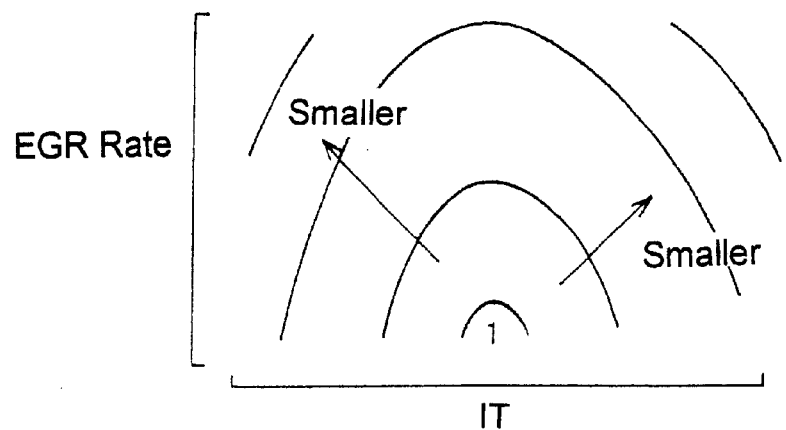
Fig. 13

FUEL INJECTION CONTROL APPARATUS FOR A DIESEL ENGINE

This application is the national phase under 35 U.S.C. §371 of International Application No. PCT/JP01/08479, which was filed on Sep. 27, 2001 and published in English on Apr. 11, 2002.

BACKGROUND OF THE INVENTION

1. Technical Field

The present invention generally relates to a fuel injection control apparatus, especially for a diesel engine. More specifically, the present invention relates to an improvement to a fuel injection control apparatus that can execute the fuel injection of one cycle in response to the operating conditions by dividing the fuel injection into a main fuel injection and a preceding pilot fuel injection of small quantity.

2. Description of Related Art

In recent years, the fuel injection modes of diesel engines are equipped with a pilot fuel injection mode that executes the fuel injection of one cycle by dividing the fuel injection into a main fuel injection and preceding pilot fuel injection of small quantity. Japanese Laid-Open Patent Publication No. 9-264159 discloses a fuel injection control apparatus for a diesel engine equipped with a pilot fuel injection mode. Under low load conditions, low temperature conditions, and other conditions where the ignitability of the fuel is low, this pilot fuel injection mode improves ignitability and contributes to reducing combustion noise by executing the main fuel injection from a state in which the small quantity of fuel of the pilot fuel injection has been combusted. Meanwhile, in regions where the load and engine speed are somewhat high, the pilot fuel injection is generally not executed and the normal injection mode is used. In short, this type of diesel engine switches between normal injection mode and pilot fuel injection mode in response to the operating conditions.

In view of the above, there exists a need for an improved fuel injection control apparatus. This invention addresses this need in the prior art as well as other needs, which will become apparent to those skilled in the art from this disclosure.

SUMMARY OF THE INVENTION

It has been discovered that during pilot fuel injection mode the total fuel injection quantity Q to be fed to the engine is first found in response to the operating conditions. FIG. 15 shows the change in fuel injection quantity and torque when the engine shifts from the pilot fuel injection mode to the normal injection mode. Next, the optimum pilot fuel injection quantity Q1 is determined and the main fuel injection quantity Q2 is found by subtracting the pilot fuel injection quantity Q1 from the total fuel injection quantity Q. Meanwhile, during the normal injection mode, the total fuel injection quantity Q is injected once at a prescribed injection timing.

In short, even during the pilot fuel injection mode, the quantity of fuel fed into the cylinder during one cycle is the same as during the normal injection mode. However, the fuel fed by the pilot fuel injection is injected relatively early and, therefore, generally has an inferior thermal efficiency to that of the fuel supplied during the main fuel injection. That is, even if the quantity of fuel is the same, the pilot fuel injection contributes little to torque generation. During the normal injection mode, in which the fuel is injected with a single injection, the thermal efficiency is relatively high because the fuel is injected at the optimum time. Likewise, the thermal efficiency is relatively high in the main fuel injection because the fuel is injected at the optimum time. Therefore, there is a drawback in that, as shown in FIG. 15, the generated engine torque increases and a torque step occurs when the engine shifts from the pilot fuel injection mode to the normal injection mode, even if the total fuel injection quantity Q is the same.

It is feasible that this kind of torque step could be avoided by taking the value of pilot fuel injection quantity Q1 that is provided in advance by the shape of the map in response to the operating conditions and correcting it further in response to the load. However, it would be difficult to reliably avoid a torque step because the load would change depending on the air-fuel ratio, supercharge pressure, etc., when the engine switched from the pilot fuel injection mode to the normal injection mode.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 11 is a characteristic graph showing the trend of the vertical component of the map for the correction of the thermal efficiency based on the center of gravity position or barycenter;

FIG. 12 is a characteristic graph showing the relationship of the thermal efficiency with respect to the injection timing and the supercharge pressure;

FIG. 13 is a characteristic graph showing the relationship of the thermal efficiency with respect to the injection timing and the EGR rate;

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
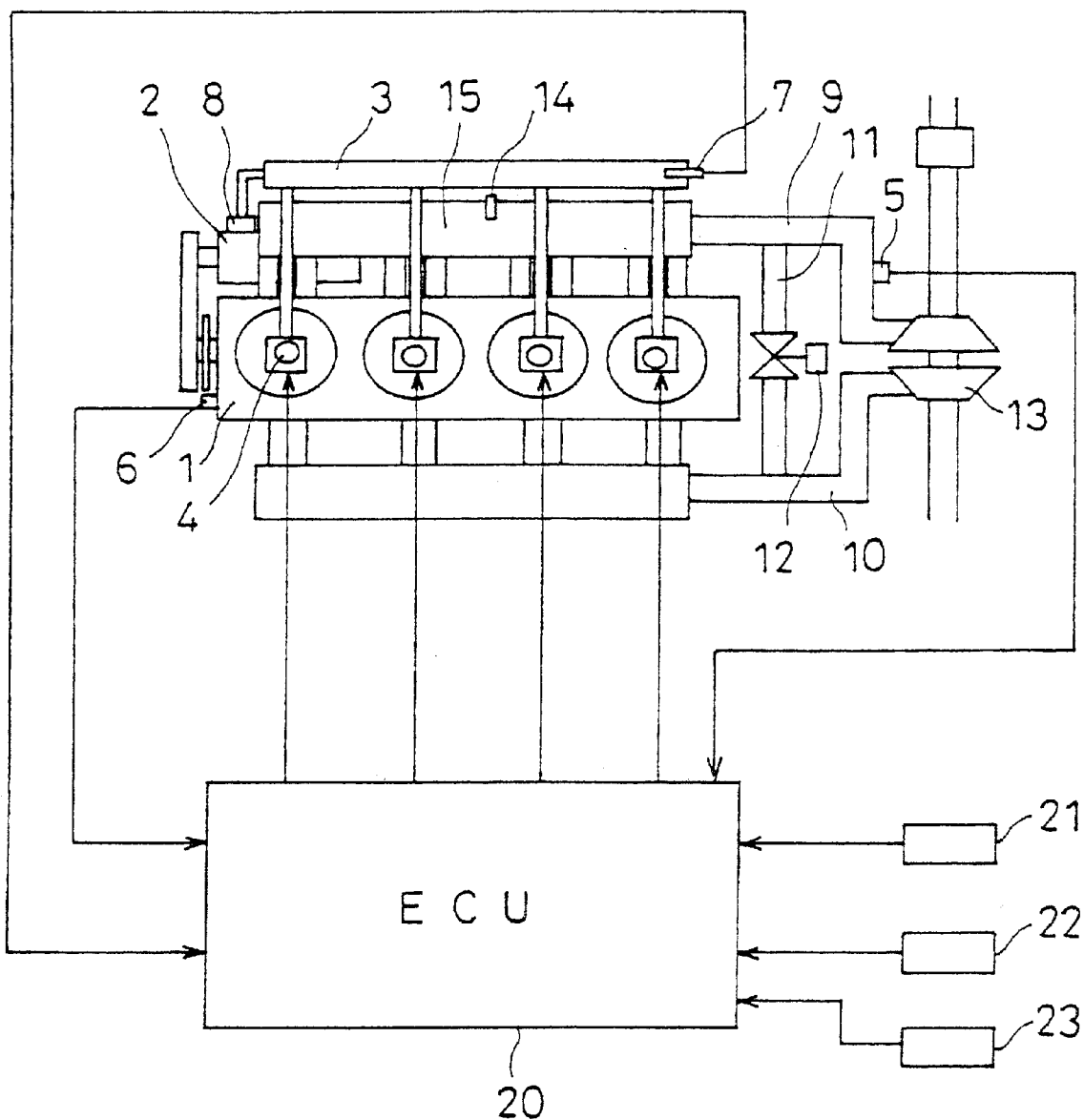
FIG. 1 is a diagrammatic view of a diesel engine fuel injection control apparatus in accordance with one embodiment of the present invention.

Referring initially to FIG. 1, the mechanical features of a fuel injection control apparatus for a diesel engine 1 is illustrated to explain a first embodiment of the present invention. As explained below, the diesel engine fuel injection control apparatus of the present invention executes the fuel injection of one cycle in response to the operating conditions of the engine 1 by dividing the fuel injection into a main fuel injection portion and a preceding pilot fuel injection portion of smaller quantity than the main fuel injection portion. The fuel injection quantities are corrected based on the thermal efficiency of the respective injection portion.

In short, when the engine 1 shifts between the normal injection mode and the pilot fuel injection mode any change in the thermal efficiency (the degree of contribution to engine torque) from the mode change is offset by the correction of the pilot fuel injection quantity and the correction of the main fuel injection quantity. As a result, the torque is smoothly continuous.

The decline in the thermal efficiency of the pilot fuel injection is caused mainly by the injection timing. The thermal efficiency declines when the injection timing deviates from the optimum timing for engine torque generation. Therefore, a fuel injection quantity that takes this thermal efficiency into account is obtained by adding a correction based on this injection timing. In one embodiment of the present invention, the thermal efficiency is established based on the respective fuel injection timings of the main fuel injection and the pilot fuel injection.

Moreover, in the present invention, the thermal efficiency can be further corrected in response to the fuel pressure. If the fuel pressure changes, the fuel injection rate changes and the thermal efficiency is affected. Similarly, in the present invention, the thermal efficiency is further corrected in response to the supercharge pressure. Also, in the present invention, the thermal efficiency can further be corrected in response to the exhaust gas recirculation rate. Since the supercharge pressure and the exhaust gas recirculation rate also affect the thermal efficiency, and it is preferred to add corrections in response to them.

Referring to FIG. 1, the diesel engine 1 is equipped with a common rail type fuel injector device that is equipped with a high pressure supply pump 2, a common rail in the form of an accumulator 3, and an injection nozzle 4 for each cylinder. The injection nozzle 4 turns the fuel injection ON and OFF by means of an internal solenoid valve. A crank angle sensor 6 is provided for detecting the crank angle (CA) and the rotational speed of the engine 1.

A pressure sensor 7 detects the fuel pressure inside the accumulator 3. The fuel pressure inside the accumulator 3 is controlled by means of a pressure regulator 8 to a target value corresponding to operating conditions determined by an engine control unit 20. As explained below, the thermal efficiency can be further corrected in response to the fuel pressure inside the accumulator 3. If the fuel pressure changes, the fuel injection rate changes and the thermal efficiency is affected.

The control unit 20 receives input signals from the crank angle sensor 6, a throttle opening sensor 21, a water temperature sensor 22, and a fuel temperature sensor 23. The throttle opening sensor 21 outputs a signal in response to the throttle opening. The water temperature sensor 22 detects the engine coolant temperature. The fuel temperature sensor 23 detects the fuel temperature. The control unit 20 uses these signals to control the fuel injection quantity and injection timing, as will be discussed later. The engine 1 is also equipped with a supercharger 13 comprising a turbocharger and a supercharge pressure sensor 5 that detects the supercharge pressure. An EGR valve 12 is provided in EGR passage 11, which links intake passage 9 with exhaust passage 10. The EGR valve 12 controls the exhaust gas recirculation amount.

The control unit 20 preferably includes a microcomputer with an injection control program that controls the fuel injection quantity and injection timing as discussed below. The control unit 20 can also include other conventional components such as an input interface circuit, an output interface circuit, and storage devices such as a ROM (Read Only Memory) device and a RAM (Random Access Memory) device. The memory circuits store processing results and control programs such as ones for controlling the fuel injection quantity and injection timing that are run by the processor circuit. The control unit 20 is operatively coupled to the supercharge pressure sensor 5, the crank angle sensor 6, the throttle opening sensor 21, the water temperature sensor 22, and the fuel temperature sensor 23 in a conventional manner. The control unit 20 is capable of selectively controlling the injection nozzle 4 by turning the fuel injection ON and OFF by means of the internal solenoid valve in accordance with the injection control program.

It will be apparent to those skilled in the art from this disclosure that the precise structure and algorithms for the control unit 20 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The supercharge pressure sensor 5, the crank angle sensor 6, the throttle opening sensor 21, the water temperature sensor 22, and the fuel temperature sensor 23 are conventional components that are well known in the art. Since the supercharge pressure sensor 5, the crank angle sensor 6, the throttle opening sensor 21, the water temperature sensor 22, and the fuel temperature sensor 23 are well known in the art, these structures will not be discussed or illustrated in detail herein. Moreover, "sensing means" as utilized in the claims should include any structure that can be utilized to carry out the function of these sensors 5, 6, 21, 22, and 23 of the present invention.

With a diesel engine fuel injection control apparatus in accordance with the present invention, when the pilot fuel injection is executed under certain operating conditions, the pilot fuel injection quantity and the main fuel injection quantity are corrected to take into account the thermal efficiency, i.e., the degree of contribution to engine torque, of the respective injection. Consequently, when the engine switches between the pilot fuel injection mode and the normal injection mode, the operability is improved without the occurrence of a torque step. Additionally, worsening of the exhaust performance caused by poor agreement with the exhaust recirculation rate, the supercharge pressure, etc., which are established in reference to a prescribed torque generation, can be avoided.

In particular, by correcting each injection quantity based on the fuel injection timing, the optimum correction can always be executed in accordance with the pilot fuel injection timing and main fuel injection timing, which are established variably in response to the operating conditions.

Also, by further correcting the thermal efficiency in response to a variety of parameters, the pilot fuel injection quantity and the main fuel injection quantity can be brought to even better suited values.

Figure 2:
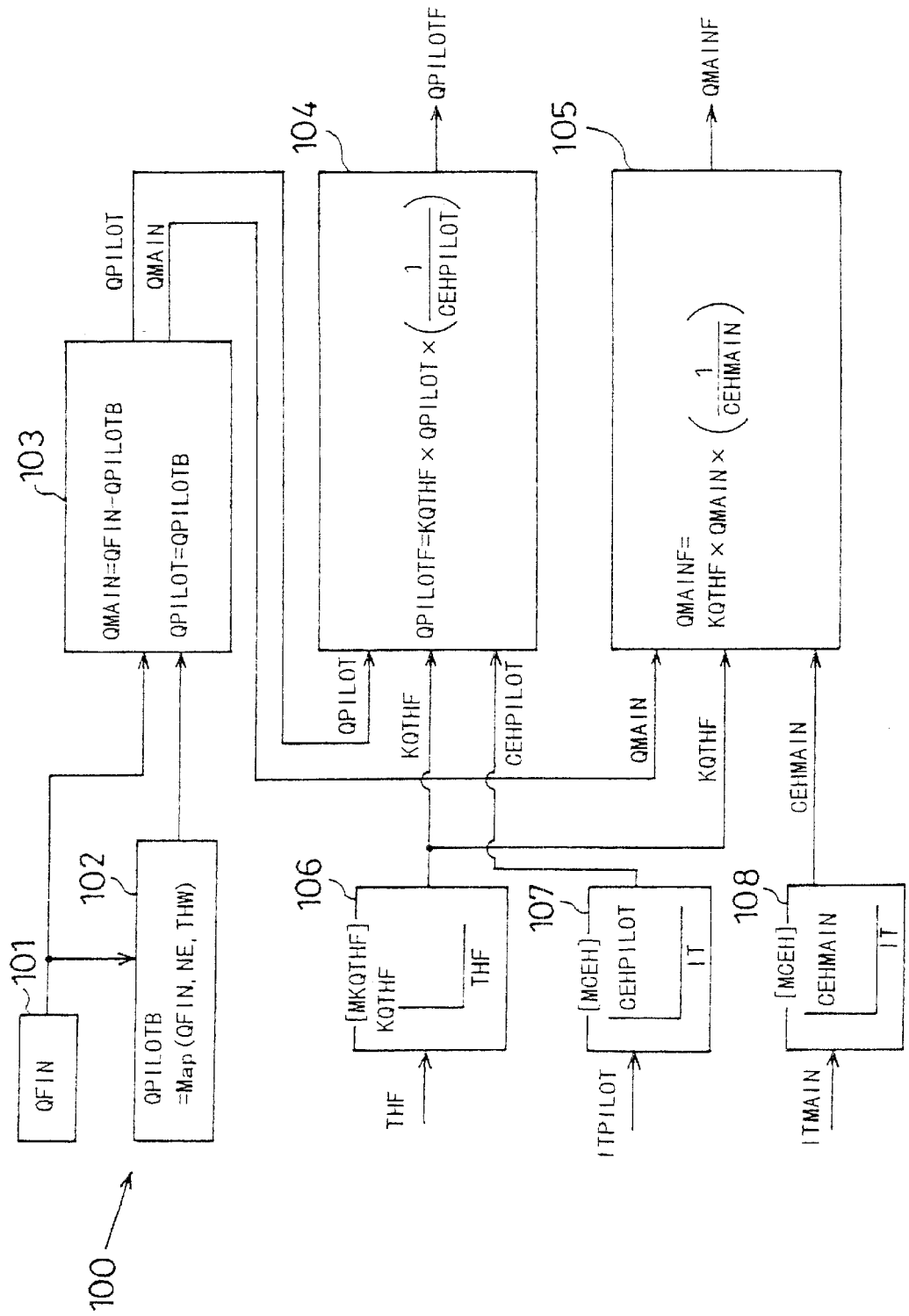
FIG. 2 is a functional block diagram of an injection quantity control system for the diesel engine fuel injection control apparatus illustrated in FIG. 1.

Referring now to FIG. 2, a block diagram illustrates the injection quantity control system 100 that forms an injection quantity control program executed by the control unit 20. The details of the injection quantity control program of the present invention are explained below in reference to this block diagram.

First, as shown in block 101 of FIG. 2, the basic total fuel injection quantity QFIN per cycle is calculated in accordance with the current operating conditions at the time. The basic total fuel injection quantity QFIN is generally determined based on the engine speed NE detected by the crank angle sensor 6 and the throttle opening detected by the throttle opening sensor 21. In other words, the basic total fuel injection quantity QFIN is the total fuel quantity required per cycle for the current operating conditions, e.g. current injection timing and current engine speed. The crank angle sensor 6 and the throttle opening sensor 21 form total fuel injection quantity determination means for determining the total fuel injection quantity QFIN per cycle. However, the "total fuel injection quantity determination means" as utilized in the claims should include any structure that can be utilized to carry out the function of these sensors 6 and 21 of the present invention.

Next, if the injection quantity control system 100 is in the pilot fuel injection mode, the required pilot fuel injection quantity QPILOTB is found using a prescribed map based on the aforementioned fuel injection amount QFIN, the engine speed NE, and the water temperature THW, as indicated in block 102. The prescribed map for the required pilot fuel injection quantity QPILOTB is stored in the control unit 20. If the injection quantity control system 100 is in normal injection mode (during which pilot fuel injection is not conducted), then the value of the pilot fuel injection quantity QPILOTB will become "0".

Whether to use the pilot fuel injection mode or the normal injection mode is determined based on the current detected operating conditions. More specifically, use of the pilot fuel injection mode or the normal injection mode is based on a prescribed mode map stored in the control unit 20. This prescribed mode map uses the aforementioned fuel injection quantity QFIN and the engine speed NE as detected parameters to determine the mode of operation. In general, the pilot fuel injection mode is only used in regions of low speed and low load. As previously mentioned, if the normal injection mode is determined based on the current detected operating conditions, then the value of the pilot fuel injection quantity QPILOTB will become "0".

After finding the pilot fuel injection quantity QPILOTB in block 102 as just described, the initial distribution of the fuel injection quantities is determined in block 103. In other words, the aforementioned fuel injection quantity QFIN is split into two portions, namely the main fuel injection quantity QMAIN and the pilot fuel injection quantity QPILOTB. The value of the main fuel injection quantity QMAIN is obtained by subtracting the pilot fuel injection quantity QPILOTB (block 102) from the fuel injection quantity QFIN (block 101), while the pilot fuel injection quantity QPILOTB is used as the pilot fuel injection quantity QPELOT.

Next, as shown in block 104, the pilot fuel injection quantity QPILOT is corrected to determine the corrected or final pilot fuel injection quantity QPILOTF. Here, corrections are determined for adjusting the pilot fuel injection quantity based on the fuel temperature THF and based on the thermal efficiency for the particular engine during pilot fuel injection and. More specifically, as shown in block 106, a prescribed fuel temperature map stored in the control unit 20 is used to determine the fuel temperature correction coefficient KQTHF corresponding to the fuel temperature THF detected by the fuel temperature sensor 23. As shown in block 107, a prescribed thermal efficiency map stored in the control unit 20 is used to find the pilot fuel injection thermal efficiency CEHPILOT corresponding to the pilot fuel injection timing ITPILOT, which based on the crank angle detected by the crank sensor 6. Then, the final pilot fuel injection quantity QPILOTF is found using the following equation.

$$QPILOTF = KQTHF \times QPILOT \times (1/CEHPILOT). \quad \text{Equation 1}$$

Similarly, as shown in block 105, corrections are determined based on the fuel temperature THF and based on the thermal efficiency for the particular engine during main fuel injection. These corrections are executed against the aforementioned main fuel injection quantity QMAIN to obtain the corrected or final main fuel injection quantity QMAINF. The fuel temperature correction coefficient KQTIF is used in block 106 in the same manner as described above. Then, as shown in block 108, a prescribed thermal efficiency map stored in the control unit 20 is used to find the main fuel injection thermal efficiency CEHMAIN corresponding to the main fuel injection timing ITMAIN, which is based on the crank angle detected by the crank sensor 6. The final main fuel injection quantity QMAINF is then found using the following equation.

$$QMAINF = KQTHF \times QMAIN \times (1/CEHMAIN). \quad \text{Equation 2}$$

Here, the pilot fuel injection timing ITPILOT and the main fuel injection timing ITMAIN are each determined based on a prescribed injection timing maps stored in the control unit 20. The prescribed injection timing maps have the fuel injection quantity QFIN and the engine speed NE as detected parameters to determine the pilot fuel injection timing ITPILOT and the main fuel injection timing ITMAIN. During the normal injection mode, the main fuel injection timing ITMAIN is equivalent to the injection timing IT. However, the pilot fuel injection mode and the normal injection mode each use different injection timing maps and control the optimum values for the respective conditions.

Figure 3:
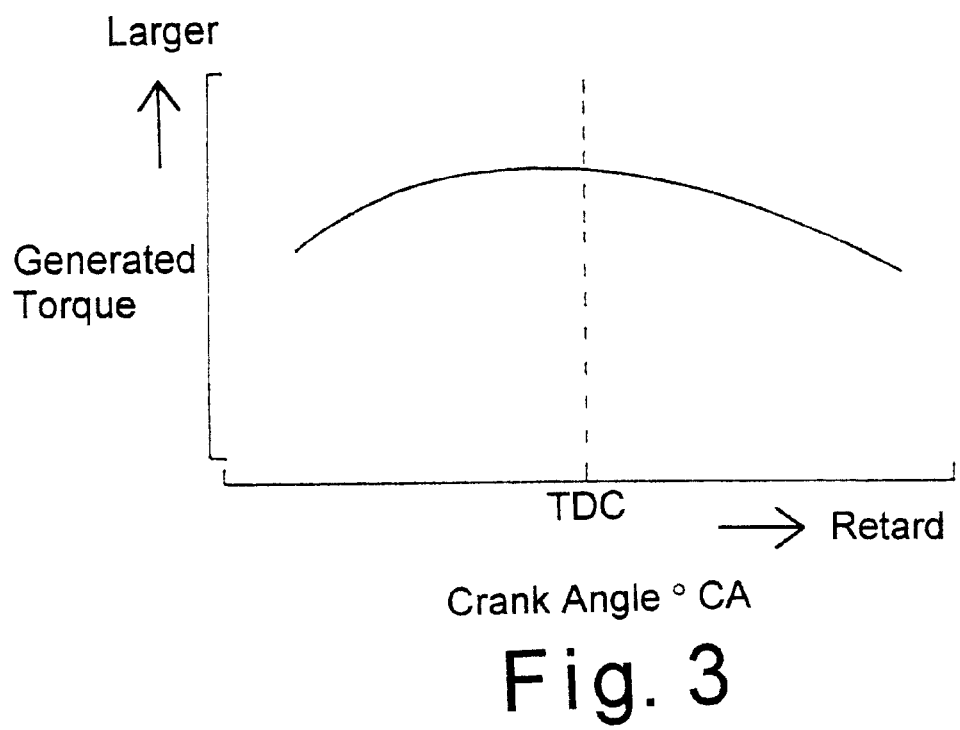
FIG. 3 is a characteristic graph showing a torque sensitivity curve with respect to he injection timing assuming the same injection quantity.
Figure 4:
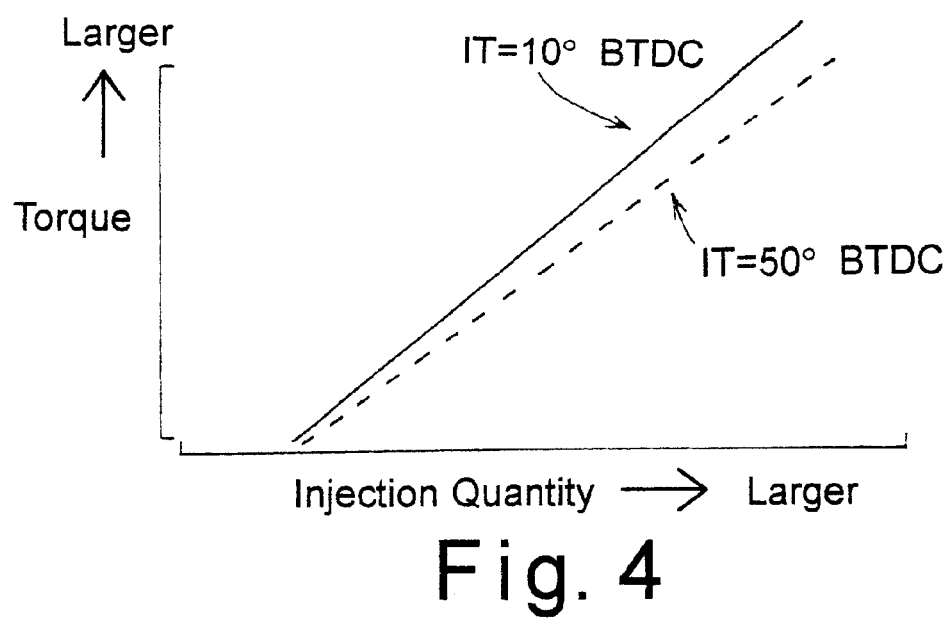
FIG. 4 is a characteristic graph showing the relationship between the injection quantity and torque for different injection timings.
Figure 5:
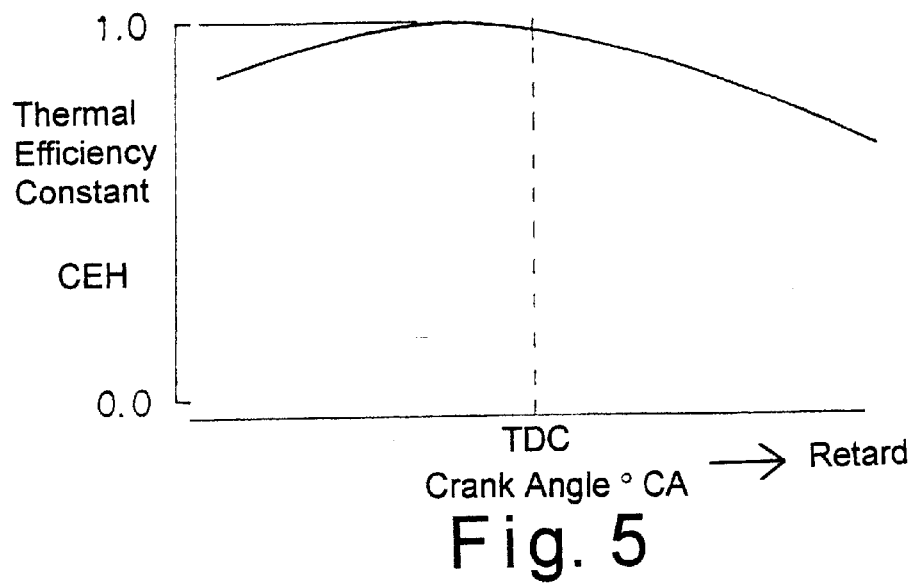
FIG. 5 is a characteristic graph showing the relationship of the thermal efficiency constant with respect to the injection timing.

The pilot fuel injection thermal efficiency CEHPILOT and the main fuel injection thermal efficiency CEHMAIN are explained based on FIGS. 3 to 5. As explained earlier, even when the same fuel is injected, the contribution to torque generation differs depending on the injection timing. FIG. 3 shows the injection timing torque sensitivity curve assuming the same injection quantity. The generated torque is maximum in the vicinity of top dead center (TDC) and decreases for both earlier and later timings. Therefore, as shown in FIG. 5, the thermal efficiency constant CEH is defined to be "1" at the point where the torque generation is maximum. The thermal efficiency maps of the previously mentioned blocks 107 and 108 are established according to the characteristic shown in FIG. 5. Thermal efficiencies CEHPILOT and CEHMAIN are each provided as a value less than or equal to "1" in accordance with the injection timing, which is based on the crank angle detected by the crank sensor 6. FIG. 4 shows an example of the relationship between the injection quantity and the generated torque for injection timings at 10° BTDC and 50° BTDC.

Figure 6:
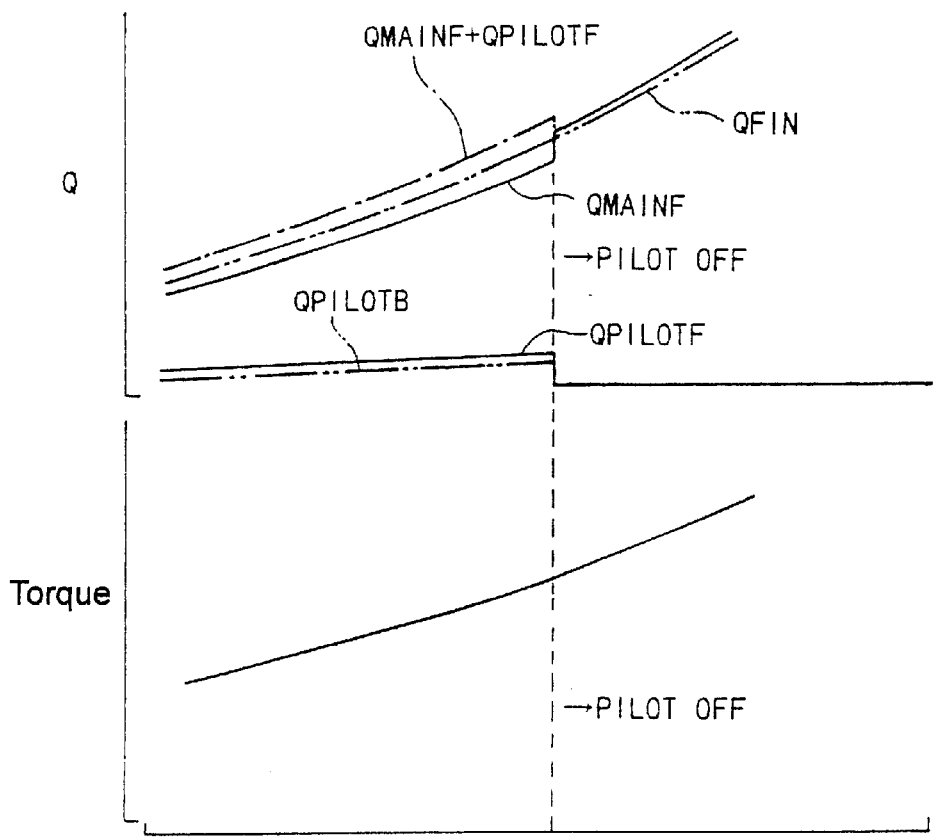
FIG. 6 is characteristic graph showing the change in the injection quantity and the torque when the engine shifts from the pilot fuel injection mode to the normal injection mode.

As explained previously, the final pilot fuel injection quantity QPILOTF and the final main fuel injection quantity QMAINF are corrected according to the difference in the thermal efficiency that is based on the difference in the injection timing. As a result, for example, the injection quantities change as shown in FIG. 6 when the engine 1 shifts from the pilot fuel injection mode to the normal injection mode in response to light acceleration. The sum of the final pilot fuel injection quantity QPILOTF and the final main fuel injection quantity QMAINF is larger than the basic injection quantity QFIN so that the decline in the thermal efficiency is offset. Therefore, a step-like torque increase does not occur when the engine 1 shifts from the pilot fuel injection mode to normal injection mode. Furthermore, in this embodiment, the basic injection quantity QFIN (equivalent to main fuel injection quantity QMAINF) is corrected based on the thermal efficiency CEHMAIN (block 105 in FIG. 2) even during normal injection mode. Consequently, the final injection quantity is slightly larger than the basic injection quantity QFIN.

In diesel engines the "injection timing" is generally defined by the injection start timing, but even if the injection start timing is the same, the average thermal efficiency will differ if there are differences in the length of the injection period. Regarding representing the thermal efficiency, the crank angle position at the middle of the injection period is preferred over the injection start timing.

Next, an even more precise method is described for determining the values for the pilot fuel injection thermal efficiency CEHPILOT and the main fuel injection thermal efficiency CEHMAIN that are used in the injection quantity control system 100 to determine the final pilot fuel injection quantity QPILOTF and the main fuel injection quantity QMAINF of FIG. 2. In particular, the thermal efficiency is further corrected in response to the fuel pressure. If the fuel pressure changes, the fuel injection rate changes and the thermal efficiency is affected. The fuel pressure inside the accumulator of an accumulator (common rail) type fuel injector device is generally variably controlled. Consequently, it is preferable to add a correction in response to the fuel pressure.

Figure 7:
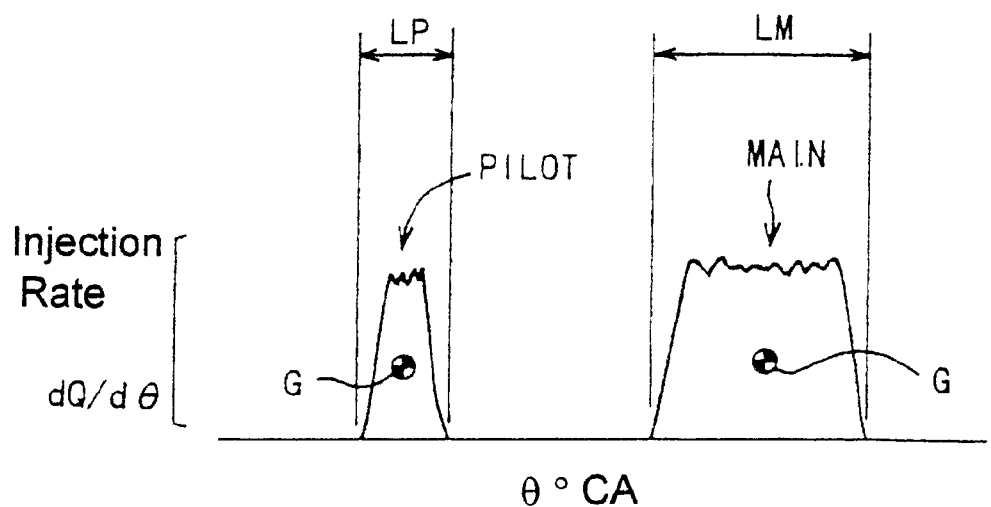
FIG. 7 is a characteristic graph showing the injection pattern and the center of gravity position or barycenter during the pilot fuel injection mode.

FIG. 7 shows the fuel injection pattern during the pilot fuel injection mode. In FIG. 7, the horizontal axis is the crank angle θ, while the vertical axis is the injection rate dQ/dθ. In this kind of injection pattern diagram, the areas of the regions indicated as the pilot fuel injection and the main fuel injection correspond to each respective injection quantity. Therefore, when the center of gravity position or barycenter G of each region is estimated, the center of gravity position or barycenter G represents the thermal efficiency of the respective injection. Thus, it is more preferable for the thermal efficiency to be determined based on this center of gravity position or barycenter G instead of based simply on the injection timing.

Figure 8:
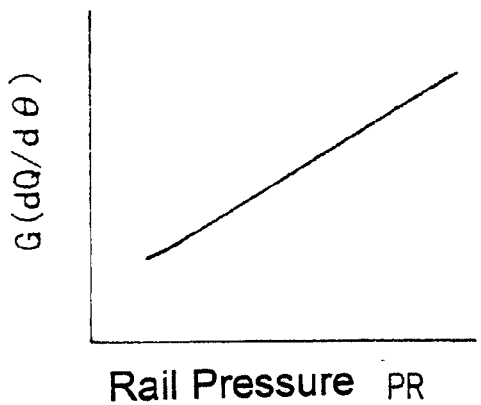
FIG. 8 is a characteristic graph showing the relationship between the rail pressure PR and the vertical component of the center of gravity position or barycenter.

The injection periods LP and LM of each injection are roughly proportional to the period during which the solenoid valve of the injection nozzle 4 is energized for each mode. Thus, the crank angle position of the center of gravity position or barycenter G can be found by adding one half of the energized period to the injection start time. Meanwhile, the vertical position of the center of gravity position or barycenter G in FIG. 7 can be calculated as a function of the rail pressure PR, as shown in FIG. 8. Specifically, the vertical position of the center of gravity position or barycenter G can be calculated as a function of the rail pressure PR, because the injection rate dQ/dθ in the injection pattern is roughly proportional to the fuel pressure (rail pressure PR) of the accumulator 3.

Figure 9:
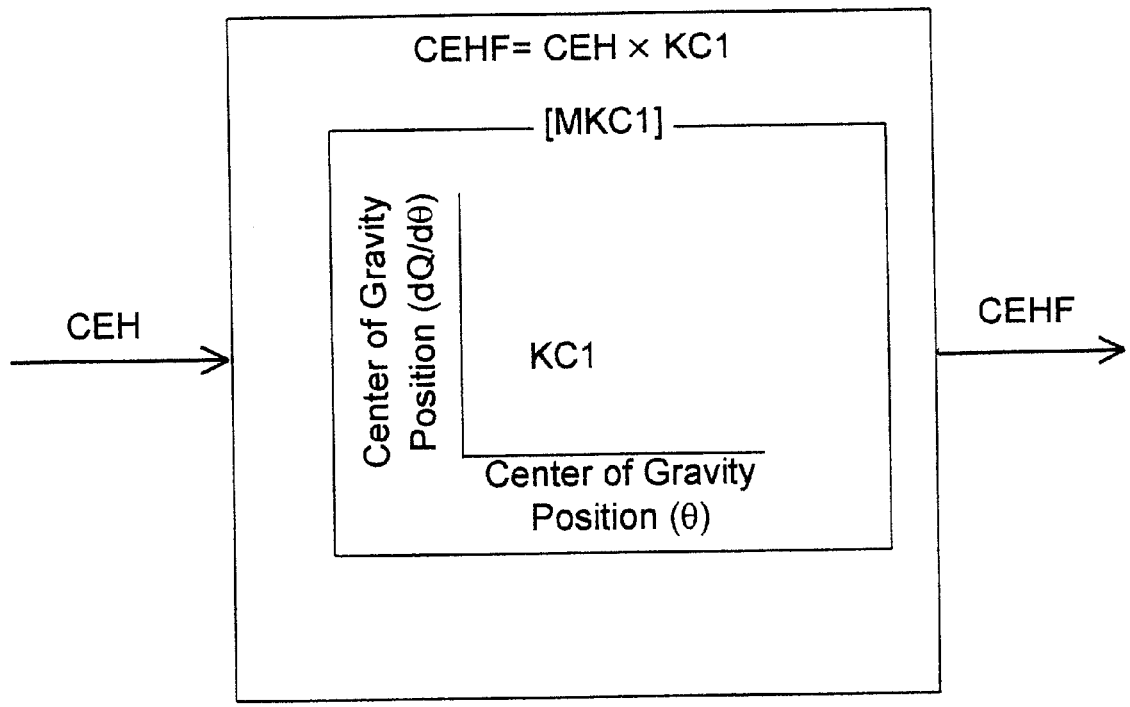
FIG. 9 is a block diagram showing a correction of the thermal efficiency based on the center of gravity position or barycenter.
Figure 10:
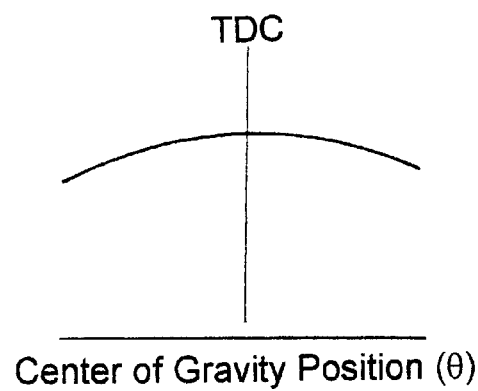
FIG. 10 is a characteristic graph showing the trend of the horizontal component of the map for the correction of the thermal efficiency based on the center of gravity position or barycenter.

Thus, as shown in FIG. 9, the value of the thermal efficiency CEHF can be brought to an even higher degree of precision by finding the correction coefficient KC1 from a prescribed thermal efficiency map based on the center of gravity position or barycenter G. In particular, the value of the thermal efficiency CEHF can be obtained by multiplying the previous thermal efficiencies CEH for the pilot fuel injection thermal efficiency CEHPILOT and the main fuel injection thermal efficiency CEHMAIN by the same correction coefficient KC1. Regarding the trends of the thermal efficiency map in FIG. 9, the trend of the horizontal component (crank angle) is shown in FIG. 10, while the trend of the vertical component (injection rate dQ/dθ) is shown in FIG. 11. Thus, by using these thermal efficiency map of FIG. 9, more precise thermal efficiencies CEHPILOT and CEHMAIN are obtained for use in the injection quantity control system 100 to determine the final pilot fuel injection quantity QPILOTF and the main fuel injection quantity QMAINF of FIG. 2 as discussed above.

Figure 14:
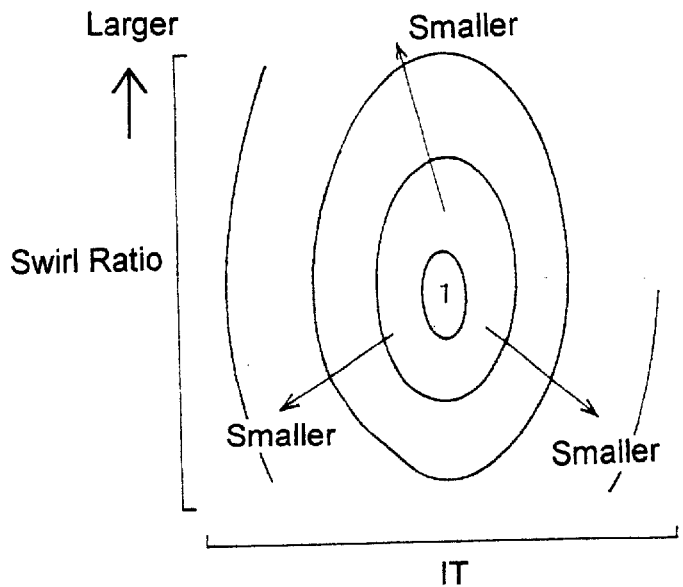
FIG. 14 is a characteristic graph showing the relationship of the thermal efficiency with respect to the injection timing and the swirl ratio.
Figure 15:
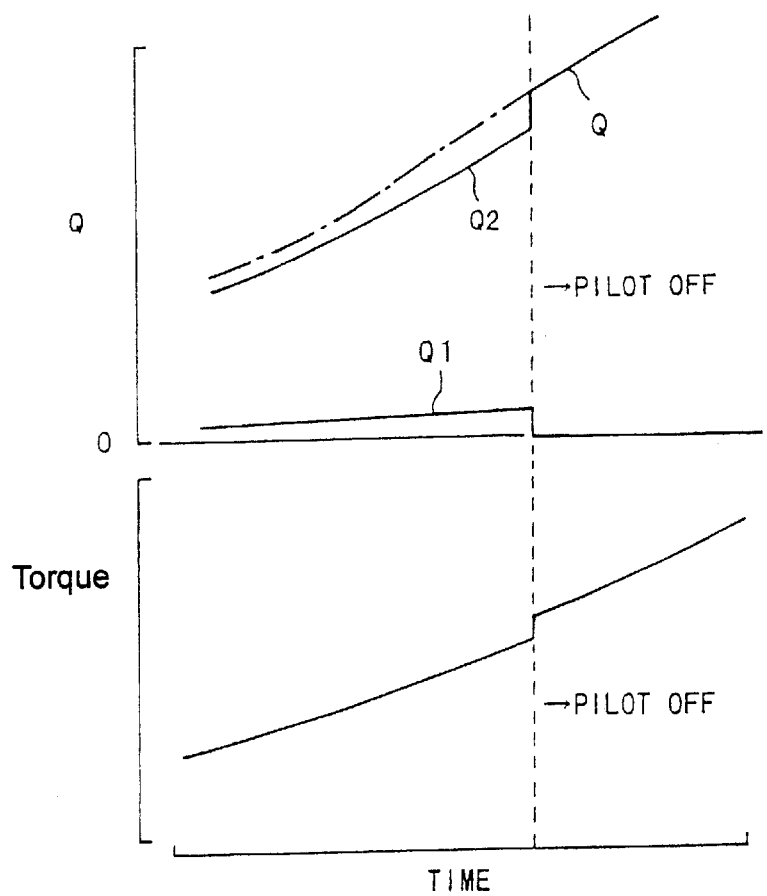
FIG. 15 is a characteristic graph showing the change in the injection quantity and the torque when the engine shifts from a conventional pilot fuel injection mode to the normal injection mode.

The thermal efficiency is also affected by the supercharge pressure, the EGR rate, the swirl ratio, etc. Therefore, the precision can be improved even further by adding corrections with respect to these items. FIG. 12 shows an example of a thermal efficiency map that uses the injection timing IT and the supercharge pressure as detected parameters. FIG. 13 shows an example of a thermal efficiency map that uses the injection timing IT and the EGR rate as detected parameters. FIG. 14 shows an example of a thermal efficiency map that uses the injection timing IT and the swirl ratio as detected parameters. Corrections of even higher precision can be achieved by using these thermal efficiency maps to find the thermal efficiencies CEHPILOT and CEHMAIN for determining the final pilot fuel injection quantity QPILOTF and the main fuel injection quantity QMAINF by using the injection quantity control system 100 of FIG. 2 as discussed above. Furthermore, these corrections can be combined as appropriate.

The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2000-301725. The entire disclosure of Japanese Patent Application No. 2000-301725 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. A fuel injection control apparatus for a diesel engine, comprising:
    a sensing section configured to receive a signal indicative of selected operating condition of a diesel engine;
    a fuel injection calculation section configured to calculate a pilot fuel injection quantity for a pilot injection and a main fuel injection quantity for a main injection that occurs following the pilot injection, in response to the signal indicative of the selected operating condition;
    a thermal efficiency correction section configured to correct at least one the pilot fuel injection quantity and the main fuel injection quantity based on a respective thermal efficiency during the pilot injection and the main injection; and
    a fuel injector configured to carry out the pilot injection and the main injection in response to the pilot fuel injection quantity and the main fuel injection quantity at least one of which are corrected in the thermal efficiency correction section.

2. A fuel injection control apparatus for a diesel engine, comprising:
    a microprocessor programmed to:
        calculate a total fuel injection quantity to be injected in a cycle based on an operation condition of the diesel engine,
        divide total fuel injection quantity into a pilot fuel injection quantity for a pilot injection and a main fuel injection quantity for a main injection, and
        correct the pilot fuel injection quantity and the main fuel injection quantity based on a pilot thermal efficiency of the pilot injection and a main thermal efficiency of the main injection respectively; and
    a fuel injector configured to carry out the pilot injection and the main injection in response to the corrected pilot fuel injection quantity and the corrected main fuel injection quantity.

3. A fuel injection control apparatus as recited in claim 2, wherein
    the pilot thermal efficiency is established based on a pilot fuel injection timing.

4. A fuel injection control apparatus as recited in claim 2, wherein
    the main thermal efficiency is established based on a main fuel injection timing.

5. A fuel injection control apparatus as recited in claim 4, wherein
    at least one of the pilot thermal efficiency and the main thermal efficiency are corrected based on a respective fuel injection period thereof.

6. A fuel injection control apparatus as recited in claim 4, wherein
    at least one of the pilot thermal efficiency and the main thermal efficiency is corrected in response to a fuel pressure provided to the fuel injector.

7. A fuel injection control apparatus as recited in claim 4, wherein
    at least one of the pilot thermal efficiency and the main thermal efficiency is corrected in response to an intake air pressure introduced in a combustion chamber of the diesel engine.

8. A fuel injection control apparatus as recited in claim 4, wherein
    at least one of the pilot thermal efficiency and the main thermal efficiency is corrected in response to a parameter related to an exhaust gas recirculation rate of the diesel engine.

9. A fuel injection control apparatus as recited in claim 2, wherein
    the pilot fuel injection quantity and the main fuel injection are corrected to be greater as the pilot thermal and the main thermal efficiency becomes smaller respectively.

10. A fuel injection control apparatus as recited in claim 2, wherein
    the microprocessor is further programmed to switch between a normal injection mode having the main injection and a pilot injection mode having both the pilot injection and the main injection in accordance with the operation condition of the diesel engine.

11. A fuel injection control apparatus as recited in claim 10, wherein
    the pilot injection mode is performed in a low-speed and low-load region, and the normal injection mode is performed other than the low-speed and low-load region.

12. A fuel injection control apparatus as recited in claim 2, wherein
    the pilot thermal efficiency and the main thermal efficiency are set smaller respectively as the position of the fuel injection thereof in a crank angle becomes advanced relative to a top dead center position of piston of the diesel engine.

13. A fuel injection control apparatus as recited in claim 2, wherein
    the pilot thermal efficiency and the main thermal efficiency are set smaller respectively as the position of the fuel injection thereof in a crank angle becomes retarded relative to a top dead center position of piston of the diesel engine.

14. A fuel injection control apparatus as recited in claim 2, wherein
    at least one of the pilot thermal efficiency and the main thermal efficiency is established based on a pilot injection barycenter and a main injection barycenter respectively.

15. A fuel injection control apparatus as recited in claim 14, wherein
    the pilot injection barycenter and the main injection barycenter in a crank angle are calculated respectively by adding one second of injection period in the crank angle to an injection start timing in crank angle.

16. A fuel injection control apparatus as recited in claim 14, wherein
    the pilot injection barycenter and the main injection barycenter in an injection rate direction are calculated as a function of a fuel pressure.

17. A fuel injection control apparatus for a diesel engine comprising:
    calculating means for calculating a total fuel injection quantity to be injected in a cycle based on an operation condition of the diesel engine;

dividing means for dividing total fuel injection quantity into a pilot fuel injection quantity for a pilot injection and a main fuel injection quantity for a main injection;

correcting means for correcting the pilot fuel injection quantity and the main fuel injection quantity based on a pilot thermal efficiency of the pilot injection and a main thermal efficiency of the main injection respectively; and an injector for carrying out the pilot injection and the main injection in response to the corrected pilot fuel injection quantity and the main fuel injection quantity.

18. A fuel injection control apparatus as recited in claim 17, wherein the pilot thermal efficiency is established based on a pilot fuel injection timing.

19. A fuel injection control apparatus as recited in claim 17, wherein the main thermal efficiency is established based on a main fuel injection timing.

* * * * *